(12) United States Patent
Allmendinger (10) Patent No.: US 7,538,662 B2
(45) Date of Patent: May 26, 2009

(54) PROGRAMMABLE VEHICLE GAUGE APPARATUS, SYSTEM, AND METHOD

(75) Inventor: Klaus K. Allmendinger, San Juan Capistrano, CA (US)

(73) Assignee: Innovate! Technology, Inc., Irvine, CA (US)

( * ) Notice: Subject to any disclaimer, the term of this patent is extended or adjusted under 35 U.S.C. 154(b) by 661 days.

(21) Appl. No.: 11/242,973

(22) Filed: Oct. 4, 2005

(65) Prior Publication Data

US 2007/0089508 A1    Apr. 26, 2007

(51) Int. Cl.
*G09F 9/302* (2006.01)
*G01D 7/04* (2006.01)

(52) U.S. Cl. .................. 340/461; 340/438; 340/449; 340/450; 340/451; 73/866.3

(58) Field of Classification Search ............... 73/866.3; 340/25.5, 426.24, 426.25, 438–445, 449, 340/450, 450.1–450.3, 451–457, 457.1–457.3, 340/458–479, 500, 501, 425.5
See application file for complete search history.

(56) References Cited

U.S. PATENT DOCUMENTS

| | | | | |
|---|---|---|---|---|
| 4,389,709 A | * | 6/1983 | Knibiehler et al. | 702/177 |
| 4,404,648 A | * | 9/1983 | Miyakawa et al. | 702/176 |
| 4,635,034 A | * | 1/1987 | Tokuyama et al. | 340/441 |
| 4,959,789 A | * | 9/1990 | Nakamura | 701/104 |
| 5,018,087 A | * | 5/1991 | Dannenberg | 702/96 |
| 5,317,614 A | * | 5/1994 | Davis et al. | 377/17 |
| 5,357,451 A | * | 10/1994 | Beaudry et al. | 702/88 |
| 5,374,917 A | * | 12/1994 | Hoffman et al. | 340/438 |
| 5,432,497 A | * | 7/1995 | Briski et al. | 340/525 |
| 5,783,993 A | * | 7/1998 | Briski et al. | 340/525 |
| 6,467,466 B1 | * | 10/2002 | Maekawa et al. | 123/529 |
| 6,721,634 B1 | * | 4/2004 | Hauler et al. | 701/1 |
| 6,756,886 B2 | * | 6/2004 | Flick | 340/426.1 |
| 6,904,355 B2 | * | 6/2005 | Yasui et al. | 701/108 |
| 7,084,859 B1 | * | 8/2006 | Pryor | 345/173 |
| 7,113,077 B2 | * | 9/2006 | Masters et al. | 340/425.5 |
| 7,420,476 B2 | * | 9/2008 | Stiffler | 340/945 |
| 2001/0012976 A1 | * | 8/2001 | Menig et al. | 701/1 |
| 2005/0228556 A1 | * | 10/2005 | Kojima | 701/29 |
| 2007/0067092 A1 | * | 3/2007 | Burkatovsky | 701/114 |

FOREIGN PATENT DOCUMENTS

DE    102005035481 A1 *  2/2007
EP         609624 A1 *  8/1994

* cited by examiner

*Primary Examiner*—David A. Rogers
(74) *Attorney, Agent, or Firm*—Gavrilovich, Dodd & Lindsey, LLP; Charles D. Gavrilovich, Jr.

(57) ABSTRACT

A programmable vehicle gauge generates and presents display information in accordance with a user modifiable gauge processing configuration. In the exemplary embodiment, data from one or more digital sensor systems is extracted from a digital sensor signal in accordance with a user modifiable data extraction configuration, the extracted data is processed in accordance with a user modifiable display information generation configuration to generate the display information and a user modifiable presentation configuration defines how the display information is presented through an output device. In accordance with the user modifiable presentation configuration, a controller generates control signals to activate visual display devices in a particular format to present the display information generated from the extracted data.

45 Claims, 4 Drawing Sheets

FIG. 7

PROGRAMMABLE VEHICLE GAUGE APPARATUS, SYSTEM, AND METHOD

BACKGROUND OF THE INVENTION

The invention relates in general to gauges and more specifically to a programmable vehicle gauge apparatus, system, and method.

Electronic gauges are used to display information based on data detected by an electronic sensor. Electronic gauges may be used to display a variety of information and are often used in vehicles to convey information that is useful or sometimes critical to the operator of the vehicle. Conventional electronic gauges in vehicles such as automobiles receive a signal from a sensor and display information in accordance with a predetermined configuration programmed during manufacturing of the vehicle. Some electronic gauges are available as after market devices that are installed or integrated within the vehicle after the vehicle has been manufactured. After market electronic gauges are typically available as a compatible sensor and gauge set where the gauge is preconfigured to operate with the particular sensor. Therefore, conventional electronic gauges are limited in that an electronic gauge can only be used with a particular sensor to display information unique to the sensor and in a format that can not be modified by the user.

Accordingly, there is a need for a programmable vehicle gauge apparatus, system, and method.

DETAILED DESCRIPTION OF THE PREFERRED EMBODIMENTS

A programmable vehicle gauge generates and presents display information in accordance with a user modifiable gauge processing configuration. In the exemplary embodiment, data from one or more digital sensor systems is extracted from a digital sensor signal in accordance with a user modifiable data extraction configuration, the extracted data is processed in accordance with a user modifiable display information generation configuration to generate the display information and a user modifiable presentation configuration defines how the display information is presented through an output device. In accordance with the user modifiable presentation configuration, a controller generates control signals to activate visual display devices in a particular format to present the display information generated from the extracted data. Accordingly, the programmable vehicle gauge is configurable to interface with any of numerous sensor systems and to display information generated from data within a sensor signal in any of several formats such that the displayed information is selectable and the manner that the information is displayed is selectable. By programming the controller that manages the visual output device, the programmable gauge is configured to receive data from one or more specified sensors, process the data to generate specified information, and display information in a specified format or presentation configuration.

Figure 1:
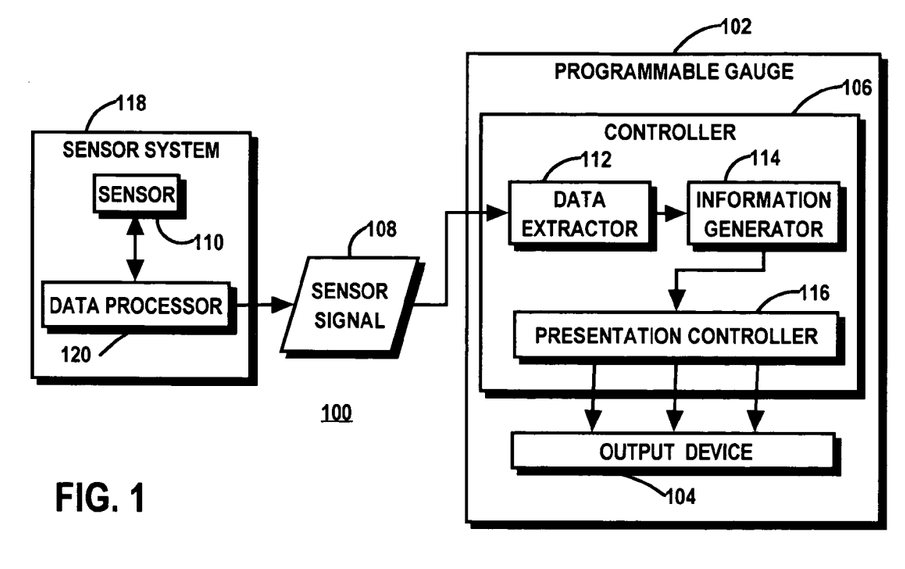
FIG. 1 is a block diagram of a vehicle gauge system in accordance with an exemplary embodiment of the invention.

FIG. 1 is a block diagram of a programmable vehicle gauge system 100 in accordance with an exemplary embodiment of the invention. The exemplary programmable vehicle gauge 102 includes at least one output device 104 and a controller 106. A sensor signal 108 received from a sensor 110 is processed by the controller 106 in accordance with a programmable configuration of the electronic gauge 102. In the exemplary embodiment, a data processor 120 converts analog data produced by the sensor 110 into the digital sensor signal 108 for transmission through a serial bus to the controller 106. The data processor 120 and the sensor 110 form a sensor system 118 that generates a digital sensor signal 108 based on a detected parameter, value, characteristic, metric, or physical state such as, for example, temperature, pressure, volume, concentration, voltage, current, power, or engine speed. Based on the data received, the controller 106 produces control signals to present information through the output device 104.

The output device 104 includes any combination of visual output devices such as light emitting diodes (LEDs), alphanumeric displays, liquid crystal displays (LCDs), and/or lights and may include audio output devices such as speakers, buzzers or other sound generators in some circumstances. An exemplary output device 104 that includes several tricolored LEDs, visual indicators, and an alphanumeric display is discussed in further detail below with reference to FIG. 3 and FIG. 4.

The controller 106 includes modifiable software code that at least partially defines a gauge processing configuration that includes a data extraction configuration, an information generation configuration, and a presentation configuration. The data extraction configuration determines the manner in which data received from the sensor 110 is read by the controller 106. The generation configuration determines the manner in which the received data is processed to create information to be presented. The presentation configuration determines the manner in which the information is presented through a visual output device 104 of the gauge 102. The functions of the controller 106 associated with the configurations are depicted in FIG. 1 as functional blocks representing a data extractor 112, an information generator 114, and a presentation controller 116. The data extractor 112, the information generator 114, and the presentation controller 116 may be implemented in any combination of hardware, firmware, and/or software. In the exemplary embodiment, at least portions of the software code running on the controller 106 can be modified to change the operation of one or more of the functions 112, 114, 116. The data extraction configuration, the information generation configuration, and the presentation configuration are based on parameters and code defining the data extractor 112, the information processor 114 and the display controller 116. Therefore, the configuration may be changed by changing the code or by changing the parameters used in the code. Although the functional blocks 112, 114, 116 are depicted as separate blocks, the functions described with reference to any single block may be performed by multiple blocks and the functions of multiple blocks may be performed within a single device or by a single set of software instructions. As mentioned above, the described functions may be performed by any combination of software, hardware and/or firmware. In particular, functions described as performed by firmware may be implanted as part of the software to allow increased flexibility in configuring the programmable gauge 102. As discussed herein, firmware is embedded software that facilitates the overall functionality of the programmable gauge 102 and may define aspects of the data extraction, information processing, and output device control. Configuration software refers to software running on the controller 106 that can be modified to configure the programmable gauge 102 to perform the data extraction, information processing, and presentation control.

Depending on the particular implementation of the programmable vehicle gauge 102, any of several techniques may be used to program the gauge 102. In the exemplary embodiment, the programmable gauge 102 is programmed using a programming application running on a programming computer such as a personal computer that is connected to the controller 106. The personal computer, such as laptop or desktop computer, is connected to an interface port connected to the appropriate input and output connections on the controller 106. In the exemplary embodiment, the interface port used for communicating with the sensor system 118 is used to interface to the serial port of the PC. The programming application running on the PC allows a user to view and change parameters stored in the controller 102 and associated with the various data extraction, information generation, and presentation configurations. The programming application generates a series of graphical user interfaces to allow the user to view and adjust the configuration software on the controller 106. The user modifies the gauge processing configuration by changing or entering parameters corresponding to one or more the data extraction, information generation, and presentation configurations by entering user-entered information through the programming computer user interface. For example, the user may modify the presentation configuration by typing LED color values using the computer keyboard. Other user interfaces such as a computer mouse, joystick, touch screen, and trackball may be used in some circumstances to enter the user-entered information.

By selecting parameters associated with the data extractor 112, the gauge 102 is programmed to extract data associated with a particular sensor 110 from the sensor signal 108. Therefore, the programmable vehicle gauge can be programmed to read data from any of several sensors 110 or from multiple sensors 110. In the exemplary embodiment, each sensor signal 108 includes a number between 0 and 1023 (10 bit) representing the captured data by the sensor 110. Where more than one sensor system 118 is connected to the programmable gauge, the 10 bit value is added to the serial stream in the order the sensor systems are connected. The programmable gauge 102 extracts the data for each sensor 118 by reading the 10 bit number from the stream starting at the location within the stream corresponding to target sensor system 118.

In the exemplary embodiment, a table for each sensor 110 is maintained in the controller 106 where each table includes data values and the corresponding to display parameters. For each 10 bit value, each table includes a corresponding an alphanumeric value for display through output device 104. Accordingly, trigger values, display values and other configuration values are established by setting the table values.

The trigger values may also be established by programming a corresponding analog value to the digital data received from the sensor 110. The user, therefore, can configure the sensor data interpretation as equivalence of a 0V to 5V signal. For example, if a pressure sensor produces a 0 to 5V for a pressure of 0 to 15 psi, the 0 to 5V signal is digitized to a 10 bit number (0 to 1023, for example) and the user enters the values for the pressure sensor indicating that the output equivalents are 0 PSI for 0 Volt and 15 PSI for 5 Volt.

The programmable vehicle gauge 102 can be programmed to provide different display information based on data received from one or more sensors 110 by selecting parameters corresponding to the information generator 114. Further, the programmable gauge may interpret received data from a sensor based on information in the serial stream. For example, the same data received from an oxygen sensor may be used to generate an oxygen concentration expressed in a percentage of oxygen to a total volume or can be used to generate a lambda value. In the exemplary embodiment, the sensor stream data includes a flag that indicates whether the sensor data is a Lambda value or an oxygen concentration value. Accordingly, the exemplary protocol is a self configuring protocol.

Other features may also be enabled by programming particular responses to identified data. In the exemplary embodiment warning indicators can be programmed at specified values or combinations of values. For example, if the data monitored is includes exhaust gas oxygen concentration and engine speed, a warning indicator can be programmed to become active when a lambda value is greater than 13.5 and the engine speed is greater than 2500 rpm.

The display information that is generated by the information generator 114 may be displayed in a variety of ways through the output device 104 by selecting parameters corresponding to the presentation configuration or format. For example, the combination of LED control signals controlling color LEDs in the visual output device 104 may be manipulated to configure the color arrangement of the LEDs under specified conditions. The activation of a particular LED is programmed for a minimum value. Trigger values are established for each LED when the presentation configuration is established or modified. The trigger values indicate the conditions for activating an LED during operation. In the exemplary embodiment, the programming interface provides a mechanism for establishing a trigger value for the leftmost LED and a rightmost LED. The other LED trigger values are linearly interpolated between these two points by the programming software. The configuration of the presentation controller 116 is discussed in further detail below with reference to FIG. 3.

After the programmable vehicle gauge is programmed and installed in the vehicle, the gauge operates by presenting the display information in accordance with the configuration. In the exemplary embodiment, the sensor 110 and the gauge 102 are connected through a serial bus and the sensor signal 108 is a binary serial stream that is generated by the sensor system 110 based on the particular parameter that is being monitored. In accordance with the data extraction configuration, the data extractor 112 of the controller 106 processes the digital signal stream received from one or more sensors 110 to extract the appropriate data bits. Display information is generated from the extracted data based on the information generation configuration. The information generator 114 generates the display information that will be presented in accordance with the user information generation configuration. As explained below in further detail, the data received from one or more sensors 110 is used to calculate or derive information that is presented through the visual output device 104. Data from a particular sensor 110 may be combined with other data, manipulated, or otherwise processed to provide different information based on the generation configuration. For example, where the sensor 110 is an oxygen sensor in a combustion engine, the data received from the oxygen sensor may be used to calculate an oxygen concentration as a percentage value or may be used to generate a Lambda value.

The visual output device 104 is activated in accordance with the presentation configuration defined, at least partially, by the display controller 116 running on the controller 106. In the exemplary embodiment, the presentation configuration is limited by the electrical and mechanical characteristics of the visual output device 104. The physical arrangement of the LEDs, for example, also defines a portion of the presentation configuration that is not modifiable by the controller 102. As described in further detail below, LED control signals are varied to change colors of the LEDs at different conditions in the exemplary embodiment allowing the programmable vehicle gauge to be configured to present information in a specified format or configuration. In some circumstances, the physical arrangement of the LEDs may be modifiable allowing for further customization by the user.

In the exemplary embodiment, the programmable vehicle gauge 102 includes a button for entering information during use. Any number and type of user interfaces may be included on the programmable gauge to provide a communication interface for the user.

Figure 2:
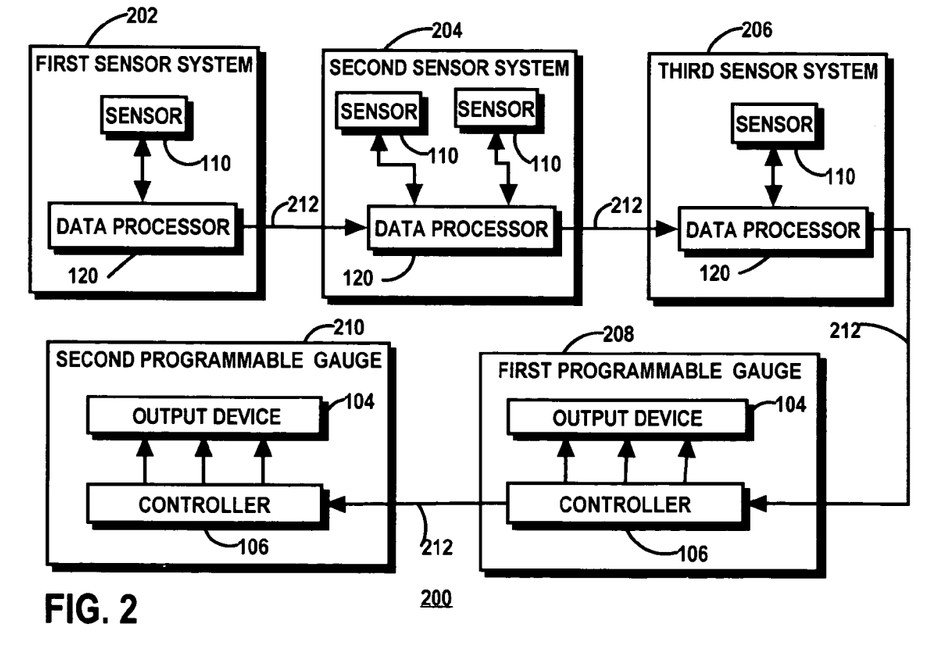
FIG. 2 is a block diagram of a vehicle gauge system in accordance with the exemplary embodiment of the invention where the vehicle gauge system includes a plurality of sensors and a plurality of programmable vehicle gauges.

FIG. 2 is a block diagram of a vehicle gauge system 200 including a plurality of sensors 202-206 (118) and a plurality of programmable gauges 208-210 (102) in accordance with a second exemplary embodiment of the invention. The sensor systems 202-206 and programmable gauges 208-210 are connected through a bus 212 where each sensor 202, 204, 206 contributes data to the bus 212 and each programmable gauge 208, 210 extracts the appropriate data from the bus in accordance with the particular data extraction configuration. Although any of numerous synchronous, asynchronous, serial, and parallel bus protocols may be used, the bus 212 is a serial bus that allows each sensor system 202, 204, 206, to add serial data to a packet and forward the packet to the next sensor in the system. The controller 106 of each programmable gauge 208, 210 is programmed to extract data within the serial bit stream based on an offset parameter that indicates a starting point within the bit stream for data extraction. After extracting the appropriate data, the first programmable vehicle gauge 208 forwards the serial bit stream to the second programmable gauge 210. The programmable gauges 208, 210 are programmed to receive data from one or more of the sensors 202-206 by configuring the data extractor 112 to receive the bits of the serial data stream associated with the target sensor or target sensors. Each programmable vehicle gauge 208, 210, therefore, is configurable to receive data from any of several types of sensor systems as well as being configurable to receive data from a particular sensor system within the vehicle.

After the data extracted by the data extractor 112 of the controller 106, the information processor 114 processes the data to generate display information to be presented through the visual output display 104. The complexity of the functions of the information processor 114 depend, among other factors, on the number of sensor systems providing the data used by the information processor 114 and the relationship between the raw data and the desired information that will be presented. A few examples of the functions performed by the information processor include the following exemplary functions.

In a first example, a single programmable gauge 102 and single sensor system 118 comprise the vehicle gauge system 200. For the example, the information processor 114 receives data from a sensor system 118 measuring temperature. During operation, an analog signal is produced or otherwise derived from a sensor 110 where the analog signal corresponds to the temperature. The data processor 120 converts the analog signal into a binary signal. In most situations the data processor 120 includes calibration information and conversion information to account for nonlinearities of the sensor 110. The data processor creates a data packet including a header and a payload that is transmitted to the programmable gauge through the bus 112 as the sensor signal 108. Accordingly, a binary representation of the temperature is received at the controller 106 of the programmable gauge 102. The data packet is processed by the data extractor 112 and the binary representation of the temperature is forwarded to the information processor 114 where the signal is converted into a format required by the display controller 116. The display controller 116 activates the visual output device 104 to present the temperature. Where the visual output device 104 includes an alphanumeric display, a number is displayed indicating the temperature. As explained above, the information processor 114, the display controller 116 and data extractor 112 are implemented by software code running on the controller 106 and the functions described by the information processor 114 may be performed by the display controller 116 in some circumstances. The programmable gauge 102, therefore, is programmed to receive and display temperature data captured by a temperature sensor 110 in first example.

In a second example, a first programmable gauge 208 is programmed to display data from any two sensors 110 of any one of the three sensor systems 202, 204, 206. The programmable gauge 208 includes configuration tables for each sensor 110 through a user interface such a button, the user can select the sensor 110 for which the data will be displayed. The appropriate table is loaded into the controller from memory as needed.

Therefore, by setting the appropriate values in the tables data from any combination of sensors can be extracted, processed and presented. Processing software in the controller can combine data to present other information through the output device.

Figure 3:
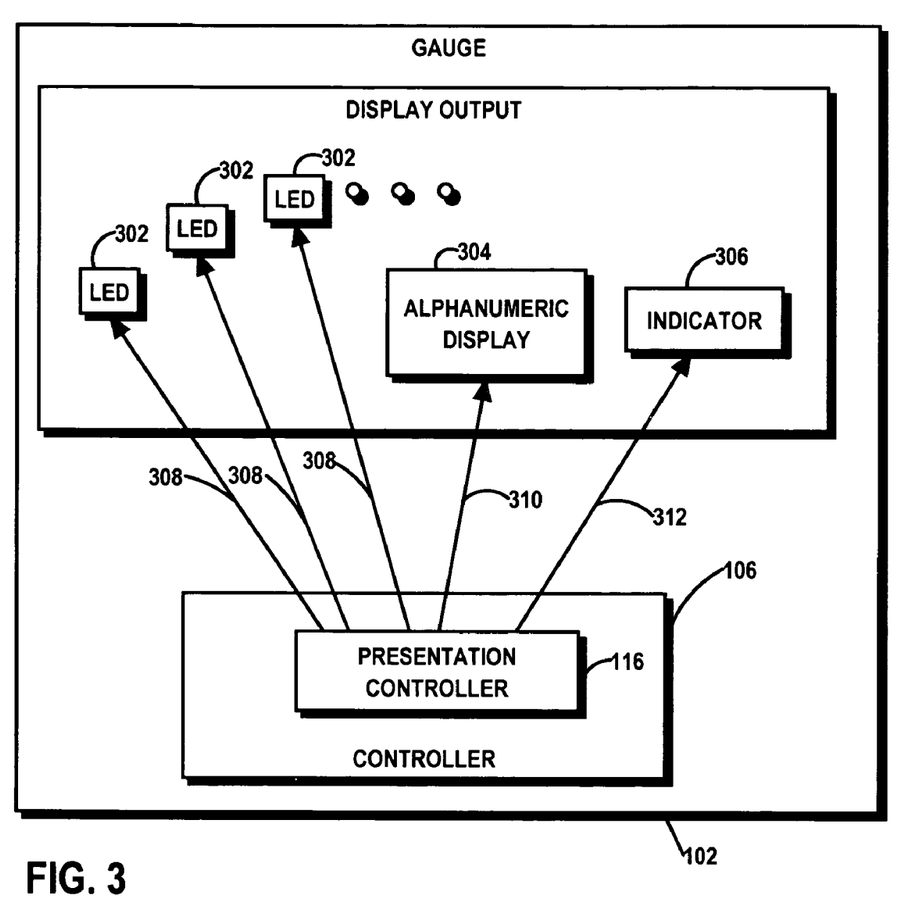
FIG. 3 is a block diagram of a programmable vehicle gauge in accordance with the exemplary embodiment of the invention.
Figure 4:
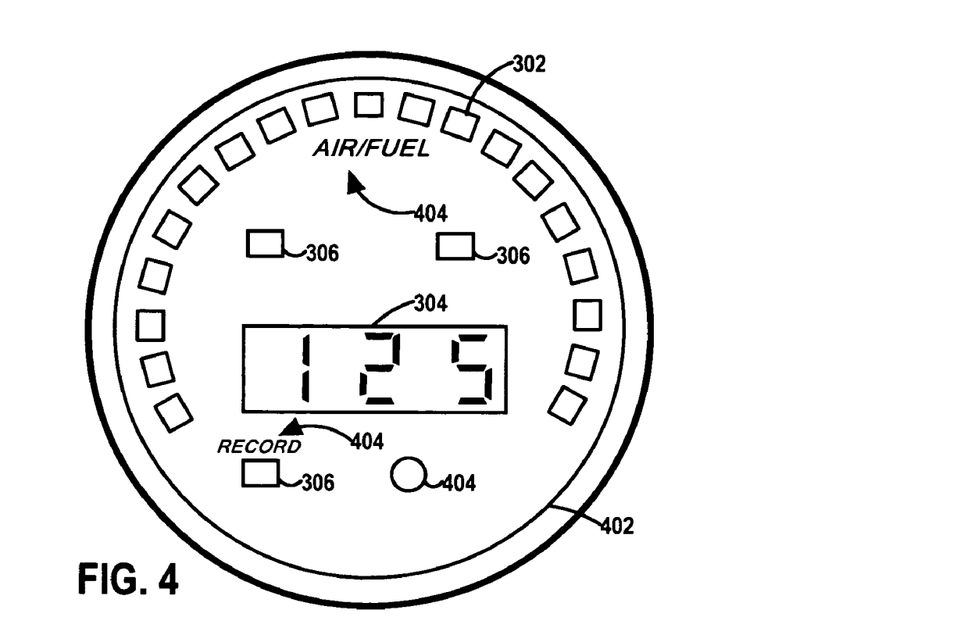
FIG. 4 is an illustration of a front view of the programmable vehicle gauge in accordance with the exemplary embodiment of the invention.

FIG. 3 is a block diagram and FIG. 4 is an illustration of a front view of an exemplary programmable vehicle gauge 102 where the visual output device 104 comprises a plurality of light emitting diodes (LEDs) 302 and an alphanumeric display 304. The exemplary gauge 102 also includes one or more additional indicators 306, such as LEDs or lights, to present information. In order to simulate an analog gauge with a needle, the LEDs 302 are arranged in an arc and are activated from left to right along the arc in accordance with a magnitude of the parameter that is being presented. The alphanumeric display 304 displays a number corresponding to the value of the parameter being monitored and presented. In some situations, however, the parameter represented by the LEDs 302 may be different that the information displayed by the alphanumeric display 304. As described above, a table for each sensor 110 is maintained in the controller 106 where each table includes data values and the corresponding to display parameters. For each 10 bit value, each table includes a corresponding an alphanumeric value for display through the alphanumeric display 304 and a corresponding LED 302 for illumination.

The presentation controller 116 generates control signals 308, 310, 312 to control the LEDS 302, indicators 306 and alphanumeric display 304. The LED control signals 308 activate the LEDs 302. The LEDs 302 in the exemplary embodiment are tri-color LEDs such a RGB (Red Green Blue) LEDs that include a common anode or common cathode and three inputs for receiving control signals corresponding to the red, green, and blue portions of the LED. Each LED control signal 308 includes a Red control signal, Green control signal and a Blue control signal. The presentation controller 116 generates pulse width modulated control signals 308 where the color of the LED in the active state is determined by duty cycles of the Red, Green and Blue control signals. The presentation controller 116, therefore, may provide LED control signals 308 that result in the LED emitting any one of several thousand colors in the active state. In the exemplary embodiment, the programming application running on the PC provides the user with an interface for selecting the color of each LED 302. An example of a suitable interface for setting the colors includes presenting graphical slide buttons on the computer monitor that allows the user to set each color for each LED 302 by combining the red, green, and blue signals. Although a representative color can be generated on the computer screen to provide feed back to the user, the program application generated color on the computer screen may be different that the actual color of the active LED 302. Accordingly, the programming application includes a manual activation of the LEDs 302 allowing the user to view the actual colors of the LEDs 302 in the active state. When selected, the manual activation of the programming application triggers the LEDs 303 from left to right in a sweep. Therefore, trigger parameters are programmed to determine when an LED 302 should be activated and color parameters determine the color of the LED when it is activated.

In addition to selecting the colors, the user may select the values that are represented by each LED 302. The range of the gauge can be selected by selecting a low value for the leftmost LED and a high value for the rightmost LED. In addition, by selecting particular values of LEDs, a non-linear display format can be programmed. A non-linear format may be advantageous where small changes near a critical value result in a significant change in performance although observing extreme values is also useful. The control signals 310 for controlling the alphanumeric display are provided in accordance the particular requirements of alphanumeric display 304.

The indicators 306 are activated by the indicator control signals 312. The indicators 306 may provide any type of information. Examples of suitable functions of the indicators 306 include warning indicators and mode indicators. A mode indicator may provide information regarding the type of parameter that is currently displayed by the alphanumeric display or the LEDS or may provide information regarding the units of a value.

FIG. 4 is an illustration of a front view of the programmable gauge in accordance with the exemplary embodiment of the invention. The visual display devices include a semicircular array of tricolored LEDs 302, an alphanumeric display 304 and at other visual indicators 306. An escutcheon 402 includes indicia 404 that is visible on the front face of the gauge 102 The indicia may be informational as well as esthetic. For example, some indicia 404 include text indicating the type of information that is presented by the gauge 102. Other indicia may label one or more visual indicators 306 or buttons 404. As described below in further detail, the escutcheon 402 is positioned between a background face and a transparent cover and is formed by printing the indicia on a transparent plastic film or foil.

Figure 5:
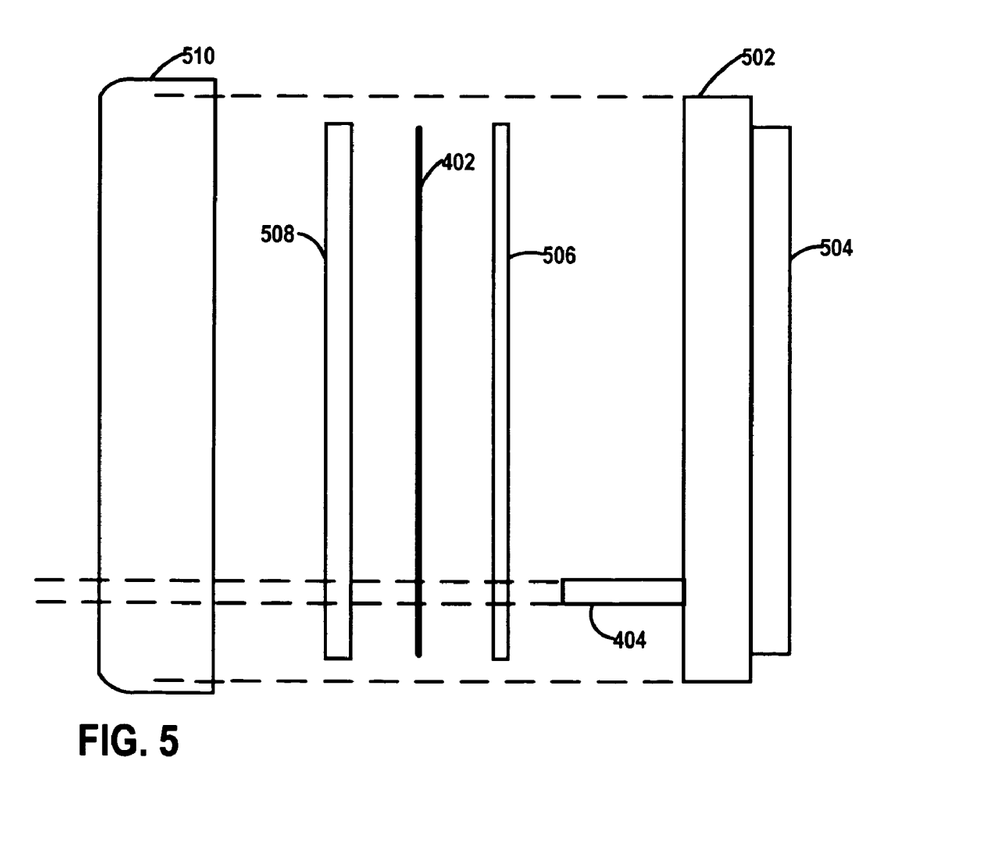
FIG. 5 is an illustration of an exploded side view of the programmable vehicle gauge in accordance with the exemplary embodiment of the invention.

FIG. 5 is an illustration of an exploded side view of the programmable gauge in accordance with the exemplary embodiment of the invention. A bezel 510 is attached to a back housing 502 that includes an electronics components section 502. The background face 506, escutcheon 406 and transparent cover 508 are posited between the bezel 406 and the back housing 502 such that the background face 506 is viewed through the escutcheon 406 and the escutcheon and the background face 506 are viewed through the transparent cover 508. As explained above, the escutcheon comprises a transparent film or foil that includes the indicia. The background face provides a background for viewing the indicia. In the exemplary embodiment, the background face is white section of cardboard. The background face can be any suitable material such as, for example, paper, plastic, or metal and may be any color. The transparent cover may be any type of transparent rigid or semi-rigid material such as glass or plastic. Although the indicia are printed on the escutcheon in the exemplary embodiment, any portion of the indicia may be printed on the background face and/or the transparent cover. The visual display devices 302, 304, 306 are visible through the escutcheon and the transparent cover.

In accordance with the exemplary embodiment, the display face can be customized by the user by replacing the escutcheon. Using an appropriate software application running on a PC, the user enters information into the appropriate location of an escutcheon template to create a new escutcheon file. The new escutcheon is created by printing the new file onto a transparent film such as that used for overhead projectors. After cutting the escutcheon to the appropriate size and punching a hole for the button, the new escutcheon is positioned within the gauge assembly. Therefore, a customized escutcheon can be tailored to programmed configurations of the programmable gauge.

Figure 6:
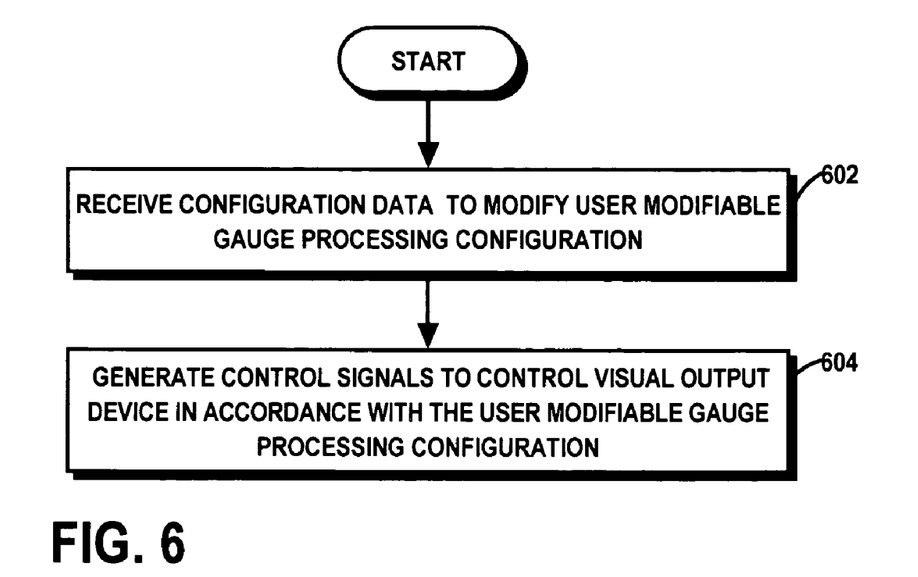
FIG. 6 is a flow chart of a method performed within the exemplary programmable vehicle gauge.

FIG. 6 is a flow chart of a method performed in a programmable vehicle gauge in accordance with the exemplary embodiment of the invention.

At step 602, configuration data to modify the user modifiable gauge processing configuration is received. A programming computer is connected to the gauge controller providing a mechanism to receive user-entered configuration at the gauge controller. In the exemplary embodiment, a serial data connection is established between the gauge controller and a personal computer (PC) running a programming application. An example of suitable connection includes connecting a serial COM1 port of a laptop or desktop computer to a stereo mini connector attached to the interface ports of the controller using a DB9 cable. The programming application presents a user interface allowing the user to enter parameters and other selections that at least partially define the gauge processing configuration. The programming application applies the user entered data to a programming stream that is transmitted through the serial connection to write the information to the controller and modify the gauge processing configuration.

At step 604, control signal for controlling the visual output device are generated in accordance with the user modifiable gauge processing configuration. The controller extracts the data from the received digital signals transmitted from one or more sensors in the vehicle, generates display information based on the data, and generates control signals to active the visual output devices as defined by the gauge configuration. In the exemplary embodiment, a data extraction configuration defines the locations within the serial data stream containing the data to be extracted. An information generation configuration defines the way the data is processed, manipulated, and/or interpreted to generate the display information. A presentation configuration defines the way that the display information is presented to the user.

Figure 7:
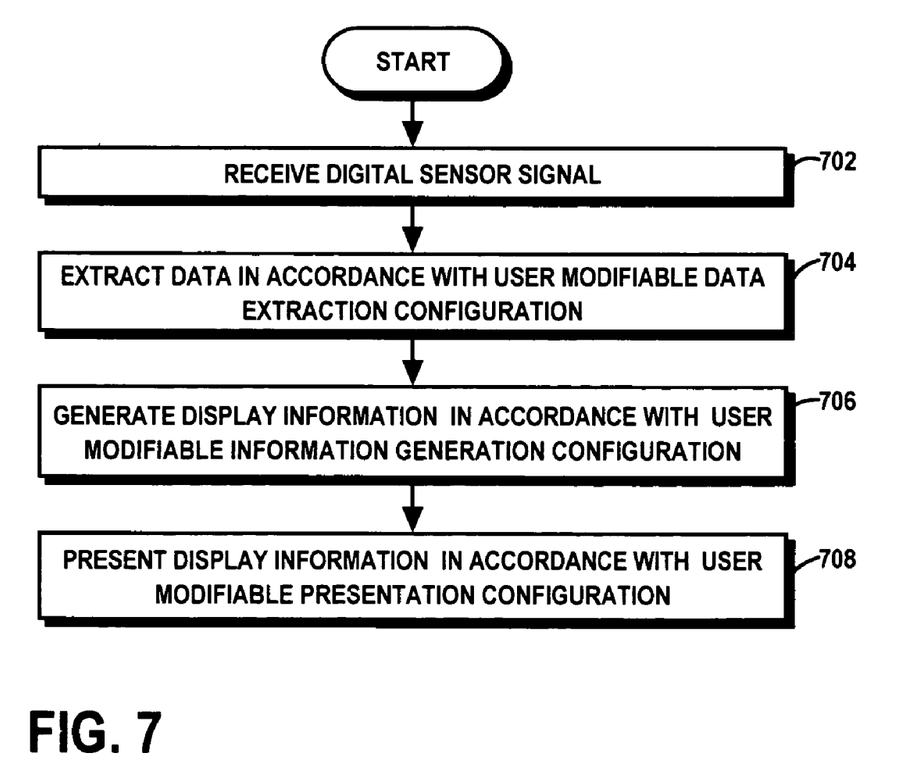
FIG. 7 is a flow chart of a method of generating output device control signals in accordance with an exemplary embodiment of the invention.

FIG. 7 is a flow chart of an exemplary method of generating control signals in the programmable vehicle gauge 102. Accordingly, the method described with reference to steps 702-708 provides and exemplary technique for performing step 604 discussed above.

At step 702, a digital data signal is received at the programmable vehicle gauge. The digital data stream may be any type of data signal that includes data from at least one vehicle sensor and may be modulated, parallel, serial, error corrected, or otherwise processed signal. Accordingly, any suitable protocol may be used to transmit the digital data signal. In the exemplary embodiment, the digital data signal is a serial data stream comprising 16 byte packets where each packet is organized into 16 bit numbers in a big endian order (i.e. most significant bit first). Where only one vehicle sensor is present in the vehicle gauge system 200, the digital sensor signal 108 is transmitted from the vehicle sensor to the programmable vehicle gauge 102. Where the vehicle gauge system 200 includes two or more vehicle sensors 202-206, the digital sensor signal 108 is transmitted from first sensor system 202 to second sensor system 204 and forwarded to any additional sensor systems 206 before being received at the programmable vehicle gauge 102. A sensor system 204 receiving a sensor signal 108 from another sensor system 202 appends the digital data collected by the sensor system 204 buy appending one or more packets to the sensor signal 108 and retransmits the sensor signal to the next sensor system 206 or to the programmable vehicle gauge 102 if the vehicle gauge system 200 does not include additional sensor systems. The programmable vehicle gauge 102, therefore, receives the sensor signal which may include data from multiple sensors.

At step 704, the data from one or more gauges is extracted from the digital data signal. The data extraction configuration determines which packets to extract and process for the particular vehicle gauge. As explained above, data from the target sensor or sensors is extracted by reading the appropriate location within the sensor stream. The sequence of sensor systems and the order of the sensors read by each in a data packet is detected by the controller that datalogs the sensor data. The order is stored on programming computer and used by the programming software to allow the user to appropriately select the sensor data to display.

At step 706, the display information is generated in accordance with the user modifiable information generation configuration. In the exemplary embodiment, the data extracted from the digital sensor signal 108 is used to generate the display information. Depending on the particular information and data, the data may be manipulated, scaled, applied to an algorithm, truncated, limited, cross-referenced with other data, combined with data from other sensors, combined with data from other sources, or used without manipulation to generate the display information.

At step 708, the display information is presented to the user in accordance with the user modifiable presentation configuration. Control signals 308, 310, 312 are generated in accordance with the presentation configuration to activate the visual output device 104 to present the display information. The LEDS, alphanumeric display and indicators 306 are activated in accordance with the display information generated based on the data received from on or more sensors. In addition to activating the LEDS at the appropriate value, the color of the LEDs when activated are determined by programmed parameters of the presentation configuration.

Therefore, in the exemplary embodiment, the programmable vehicle gauge generates and presents display information derived from data extracted from the digital sensor signal 108 in accordance with a user modifiable gauge processing configuration. The data extraction configuration of the gauge processing configuration defines the locations of data to be extracted from the digital sensor signal. The information generation configuration of the gauge processing configuration defines how the data is used to generate the display information. The presentation configuration of the gauge processing configuration defines how the display information is presented through the output device. The programmable vehicle gauge can be used as part of a gauge system 200 including multiple sensor systems and multiple gauges. Each gauge can be programmed to present information generated based on data captured by from one or more of the sensor systems. Accordingly, the programmable vehicle gauge, system, and method provide a flexible and modifiable mechanism for displaying a variety of information in a variety of user selectable formats. Due to the economies of scale, manufacturing costs of the programmable vehicle gauge can be significantly reduced as compared producing non-modifiable sensor-gauge sets.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A programmable vehicle gauge comprising:
   a controller comprising a data extractor comprising data extraction software defining a user modifiable data extraction configuration, the data extractor configured to extract data from a digital sensor signal based on the data extraction configuration, the controller configured to generate, based on the digital sensor signal, output device control signals in accordance with a user modifiable processing configuration; and
   an output device for presenting information based on the digital sensor signal in response to the output device control signals.

2. A programmable vehicle gauge in accordance with claim 1, wherein the data extractor is configured to extract, from the digital device signal, particular data corresponding to a particular sensor of the plurality of sensors, the output device for presenting information based on the data corresponding to the particular sensor in response to the output device control signals.

3. A programmable vehicle gauge in accordance with claim 1, the controller comprising processing software defining the user modifiable processing configuration.

4. A programmable vehicle gauge in accordance with claim 3, wherein the processing software is modifiable by a programming application running on a programming computer connected to the controller.

5. A programmable vehicle gauge in accordance with claim 4, wherein the processing software comprises at least one modifiable parameter defining the user modifiable processing configuration, the at least one modifiable parameter modifiable by the programming application.

6. A programmable vehicle gauge in accordance with claim 5, the data extractor configured to extract data bits from locations within the digital sensor signal defined by the data extraction configuration.

7. A programmable vehicle gauge in accordance with claim 5, wherein the data extractor is configured to extract data captured by a plurality of sensors.

8. A programmable vehicle gauge in accordance with claim 5, the controller comprising an information generator comprising information generator software defining a user modifiable information generation configuration, the information generator configured to produce display information based on data within the digital sensor signal.

9. A programmable vehicle gauge in accordance with claim 8, the information generator is configured to calculate an information value based on the data.

10. A programmable vehicle gauge in accordance with claim 9, wherein the data includes first sensor data captured by a first sensor and second sensor data captured by a second sensor.

11. A programmable vehicle gauge in accordance with claim 10, the information generator configured to produce the display information in accordance with a table.

12. A programmable vehicle gauge in accordance with claim 5, the controller comprising a presentation controller comprising presentation software defining a user modifiable presentation configuration.

13. A programmable vehicle gauge in accordance with claim 12, wherein the output device comprises a plurality of light emitting diodes (LEDs), the user modifiable presentation configuration defining a state of each of the LEDs associated with presentation information derived from the digital sensor signal.

14. A programmable vehicle gauge in accordance with claim 13, wherein the LEDs are multicolor LEDs and the user modifiable presentation configuration defines a color of light emitted by each LED in an active state.

15. A programmable vehicle gauge in accordance with claim 13, wherein the output device comprises an alphanumeric display, the user modifiable presentation configuration defining an information value for presenting through the alphanumeric display.

16. A programmable vehicle gauge in accordance with claim 15, wherein the information value corresponds to the presentation information presented by the LEDs.

17. A programmable vehicle gauge in accordance with claim 13, wherein the user modifiable presentation configuration defines a plurality of trigger values corresponding to the plurality of LEDs, the controller activating each LED when the corresponding trigger value is reached.

18. A programmable vehicle gauge in accordance with claim 17, wherein LEDs are arranged in an arc, the controller activating the LEDs to represent an analog display representing the presentation information.

19. A programmable vehicle gauge in accordance with claim 17, wherein the user modifiable presentation configuration defines a range of trigger values.

20. A method of processing digital signals received from a sensor within a vehicle, the method comprising:
receiving a digital sensor signal comprising data measured by a sensor;
extracting data from the digital sensor signal in accordance with a user modifiable data extraction configuration and generating control signals to control a visual output device in accordance with the data and a user modifiable processing configuration.

21. A method in accordance with claim 20, wherein the extracting data from the digital sensor signal comprises extracting particular data corresponding to a particular sensor of a plurality of sensors and wherein the presenting information comprises presenting information based on the data corresponding to the particular sensor in response to the output device control signals.

22. A method in accordance with claim 20, wherein the extracting comprises extracting data bits from locations within the digital sensor signal defined by the data extraction configuration.

23. A method in accordance with claim 22, wherein the extracting comprises extracting data captured by a plurality of sensors.

24. A method in accordance with claim 20, further comprising:
receiving user entered information at least partially defining the user modifiable processing configuration.

25. A method in accordance with claim 24, wherein the generating comprises:
executing gauge software defining the user modifiable processing configuration.

26. A method in accordance with claim 25, wherein the user entered information comprises parameters within the gauge software program.

27. A method in accordance with claim 26, further comprising:
communicating with a computer running a programming application configured to modify the gauge software program in accordance with the user entered information, the user entered information accepted by the computer.

28. A method in accordance with claim 20, the generating comprising:
generating the control signals in accordance with a user modifiable presentation configuration.

29. A method in accordance with claim 28, wherein the generating comprises generating signals to control an alphanumeric display to present an information value based on the data.

30. A method in accordance with claim 29, wherein the generating comprises:
generating display information based on data within the digital sensor signal in accordance with a user modifiable information generation configuration.

31. A method in accordance with claim30, wherein the generating display information comprises:
calculating an information value based on the data.

32. A method in accordance with claim 31, wherein the data includes first sensor data captured by a first sensor and second sensor data captured by a second sensor.

33. A method in accordance with claim 28, wherein the generating comprises:
executing presentation software defining the user modifiable presentation configuration.

34. A method in accordance with claim 33, wherein generating comprises generating control signals to activate a plurality of light emitting diodes (LEDs), the user modifiable presentation configuration defining a state of each of the LEDs associated with presentation information derived from the digital sensor signal.

35. A method in accordance with claim 34, wherein the LEDs are multicolor LEDs and the user modifiable presentation configuration defines a color of light emitted by each LED in an active state.

36. A method in accordance with claim 34, wherein the user modifiable presentation configuration defines a plurality of trigger values corresponding to the plurality of LEDs, the generating comprises activating each LED when the corresponding trigger value is reached.

37. A method in accordance with claim 36, wherein LEDs are arranged in an arc, the activating comprising activating the LEDs to represent an analog display representing the presentation information.

38. A method in accordance with claim 36, wherein the user modifiable presentation configuration defines a range of trigger values.

39. A vehicle gauge system comprising:
   a plurality of sensor systems connected by a data bus, each sensor system comprising a sensor and a data processor configured to convert analog data captured by the sensor into a digital sensor signal;
   a programmable vehicle gauge connected the bus and configured to extract the data from the data bus in accordance with a user modifiable data extraction configuration and to present display information based on the data from at least one of the sensor systems in accordance with a user modifiable gauge processing configuration.

40. A vehicle gauge system in accordance with claim 39, the programmable vehicle gauge comprising processing software defining the user modifiable processing configuration.

41. A vehicle gauge system in accordance with claim 40, wherein the processing software is modifiable by a programming application running on a programming computer connected to the programmable vehicle gauge.

42. A vehicle gauge system in accordance with claim 41, wherein the processing software comprises at least one modifiable parameter defining the user modifiable processing configuration, the at least one modifiable parameter modifiable by the programming application.

43. A vehicle gauge system in accordance with claim 42, the programmable vehicle gauge comprising:
   a presentation controller comprising presentation software defining a user modifiable presentation configuration.

44. A vehicle gauge system in accordance with claim 42, the programmable vehicle gauge comprising:
   an information generator comprising information generator software defining a user modifiable information generation configuration, the information generator configured to produce display information based on data within the digital sensor signal.

45. A vehicle gauge system in accordance with claim 42, the programmable vehicle gauge comprising:
   a data extractor comprising data extraction software defining the user modifiable data extraction configuration, the data extractor configured to extract data from the digital sensor signal based on the data extraction configuration.

* * * * *